United States Patent
Toda et al.

(10) Patent No.: US 12,552,936 B2
(45) Date of Patent: *Feb. 17, 2026

(54) CURABLE ORGANOPOLYSILOXANE COMPOSITION AND CURED PRODUCT THEREOF, PROTECTIVE AGENT OR ADHESIVE, AND ELECTRIC/ELECTRONIC DEVICE

(71) Applicant: DOW TORAY CO., LTD., Tokyo (JP)

(72) Inventors: Nohno Toda, Ichihara (JP); Manabu Sutoh, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 722 days.

This patent is subject to a terminal disclaimer.

(21) Appl. No.: 17/788,093

(22) PCT Filed: Dec. 23, 2020

(86) PCT No.: PCT/JP2020/048201
§ 371 (c)(1),
(2) Date: Aug. 17, 2022

(87) PCT Pub. No.: WO2021/132349
PCT Pub. Date: Jul. 1, 2021

(65) Prior Publication Data
US 2023/0040967 A1  Feb. 9, 2023

Related U.S. Application Data

(60) Provisional application No. 62/953,609, filed on Dec. 26, 2019.

(51) Int. Cl.
*C08L 83/04* (2006.01)
*C09J 183/04* (2006.01)

(52) U.S. Cl.
CPC ............ *C08L 83/04* (2013.01); *C09J 183/04* (2013.01)

(58) Field of Classification Search
None
See application file for complete search history.

(56) References Cited

U.S. PATENT DOCUMENTS

| | | | |
|---|---|---|---|
| 5,270,425 A | 12/1993 | Vanwert et al. | |
| 6,905,904 B2* | 6/2005 | Gardner | G02B 6/138 438/31 |
| 7,799,842 B2* | 9/2010 | Anderson | C08J 5/04 522/74 |
| 8,642,674 B2* | 2/2014 | Ikeno | C08L 83/04 520/1 |
| 8,865,800 B2* | 10/2014 | Stammer | C08L 101/10 524/502 |
| 8,952,077 B2* | 2/2015 | Igarashi | C08L 83/00 520/1 |
| 8,968,627 B2* | 3/2015 | Irmer | C08J 5/00 264/494 |
| 9,714,344 B2* | 7/2017 | Mayumi | C08L 83/04 |
| 11,161,981 B2* | 11/2021 | Steinmann | C08K 5/56 |
| 12,122,915 B2* | 10/2024 | Toda | B05D 1/26 |
| 2003/0235383 A1* | 12/2003 | Gardner | G03F 7/0757 385/129 |
| 2010/0292361 A1* | 11/2010 | Koellnberger | C07F 17/02 556/11 |
| 2013/0072592 A1* | 3/2013 | Inafuku | C09D 183/04 427/515 |
| 2013/0096223 A1* | 4/2013 | Ikeno | C08L 83/04 522/148 |
| 2013/0183776 A1* | 7/2013 | Kashiwagi | G03F 7/40 522/66 |

(Continued)

FOREIGN PATENT DOCUMENTS

| | | |
|---|---|---|
| CN | 102181159 A | 9/2011 |
| CN | 105400486 A | 3/2016 |

(Continued)

OTHER PUBLICATIONS

Hofmann et al. Fifty Years of Hydrosilylation in Polymer Science: A Review of Current Trends of Low-Cost Transition-Metal and Metal-Free Catalysts, Non-Thermally Triggered Hydrosilylation Reactions, and Industrial Applications. Polymers. 2017; 9(10):534, pp. 1-37. (Year: 2017).*
Lukin, et al. Platinum-Catalyzed Hydrosilylation in Polymer Chemistry. Polymers 2020, 12, 2174, pp. 1-22. (Year: 2020).*
Kaur et al. Using light to control the inhibition of Karstedt's catalyst. Org. Chem. Front., 2019,6, 1253-1256. (Year: 2019).*
Fink. (2005). Reactive Polymers Fundamentals and Applications—A Concise Guide to Industrial Polymers. William Andrew Publishing/Plastics Design Library. [online]. [retrieved on Apr. 4, 2005]. Retrieved from <https://app.knovel.com/hotlink/pdf> (Year: 2005).*
International Search Report (with English translation) for PCT/JP2020/048195 dated Mar. 22, 2021, 5 pages.

(Continued)

Primary Examiner — Sanza L. McClendon
(74) Attorney, Agent, or Firm — Warner Norcross + Judd LLP

(57) ABSTRACT

A one-component curable organopolysiloxane composition that has excellent storage stability, favorable curability and adhesion at relatively low temperatures, and an appropriate pot life is provided. In particular, the composition has excellent curability even at temperatures of 80° C. or lower and excellent adhesion to resins such as polyester, polyphenylene sulfide, and the like. Furthermore, the composition can be cured in a short period of time by increasing the temperature to a high temperature when rapid curing is required. The composition comprises: (A) an organopolysiloxane having at least two alkenyl groups in each molecule thereof; (B) an organopolysiloxane having at least two silicon atom-bonded hydrogen atoms in a molecule; (C) a photo-active hydrosilylation reaction catalyst; (D) a condensation reaction catalyst; (E) a curing inhibitor; and (F) an adhesion imparting agent having at least one terminal trialkoxysilyl group.

21 Claims, No Drawings

(56) References Cited

U.S. PATENT DOCUMENTS

| | | | |
|---|---|---|---|
| 2014/0291872 A1* | 10/2014 | Harkness | H01L 23/3171 |
| | | | 522/66 |
| 2014/0356620 A1 | 12/2014 | Rathore et al. | |
| 2015/0051345 A1 | 2/2015 | Fang et al. | |
| 2015/0124338 A1 | 5/2015 | Mayumi et al. | |
| 2016/0194496 A1 | 7/2016 | Okawa et al. | |
| 2016/0233395 A1 | 8/2016 | Miyamoto | |
| 2017/0121462 A1 | 5/2017 | Fujisawa et al. | |
| 2018/0314352 A1 | 11/2018 | Wang et al. | |
| 2020/0347229 A1 | 11/2020 | Fujisawa et al. | |
| 2023/0050175 A1* | 2/2023 | Toda | C09J 183/04 |

FOREIGN PATENT DOCUMENTS

| | | | |
|---|---|---|---|
| CN | 106414612 A | 2/2017 | |
| CN | 108250446 A | 7/2018 | |
| JP | H04178461 A | 6/1992 | |
| JP | H06207105 A | 7/1994 | |
| JP | H08231939 A | 9/1996 | |
| JP | H10195085 A | 7/1998 | |
| JP | 2002170978 A | 6/2002 | |
| JP | 2005194474 A | 7/2005 | |
| JP | 2005290312 A * | 10/2005 | |
| JP | 2006348119 A | 12/2006 | |
| JP | 2007235013 A | 9/2007 | |
| JP | 2009135105 A | 6/2009 | |
| JP | 2010047646 A * | 3/2010 | |
| JP | 2010248410 A | 11/2010 | |
| JP | 2012007058 A | 1/2012 | |
| JP | 2012204016 A | 10/2012 | |
| JP | 5342830 B2 * | 11/2013 | |
| JP | 2014169412 A | 9/2014 | |
| JP | 2015110752 A | 6/2015 | |
| JP | 2015199851 A | 11/2015 | |
| JP | 2018003194 A | 1/2018 | |
| JP | 2018119021 A | 8/2018 | |
| JP | 2018538423 A | 12/2018 | |
| JP | 6531724 B2 * | 6/2019 | |
| TW | 201817820 A | 5/2018 | |
| WO | 2006135036 A1 | 12/2006 | |
| WO | 2014188872 A1 | 11/2014 | |
| WO | 2015053412 A1 | 4/2015 | |
| WO | 2015056726 A1 | 4/2015 | |
| WO | WO-2015056483 A1 * | 4/2015 | B29C 59/002 |
| WO | 2018043270 A1 | 3/2018 | |

OTHER PUBLICATIONS

International Search Report (with English translation) for PCT/JP2020/048195 dated Mar. 22, 2021, 6 pages.
Machine assisted English translation of JPH04178461 obtained from https://worldwide.espacenet.com/patent/ on Nov. 9, 2022, 6 pages.
Machine assisted English translation of JP2005290312 obtained from https://patents.google.com/patent on Nov. 9, 2022, 10 pages.
Machine assisted English translation of JP2010248410 obtained from https://patents.google.com/patent on Nov. 9, 2022, 10 pages.
Machine assisted English translation of JP2018003194 obtained from https://patents.google.com/patent on Nov. 10, 2022, 11 pages.
Machine assisted English translation of JPH08231939 obtained from https://patents.google.com/patent on Nov. 10, 2022, 7 pages.
Machine assisted English translation of JP2014169412 obtained from https://patents.google.com/patent on Nov. 10, 2022, 10 pages.
Machine assisted English translation of JP2005194474 obtained from https://patents.google.com/patent on Nov. 10, 2022, 10 pages.
Machine assisted English translation of CN108250446 obtained from https://patents.google.com/patent on Nov. 10, 2022, 8 pages.
Machine assisted English translation of CN102181159 obtained from https://patents.google.com/patent on Nov. 10, 2022, 13 pages.
Machine assisted English translation of CN105400486 obtained from https://patents.google.com/patent on Nov. 10, 2022, 7 pages.
Machine assisted English translation of JP2012007058 obtained from https://patents.google.com/patent on Nov. 10, 2022, 12 pages.
Machine assisted English translation of JP2018119021 obtained from https://patents.google.com/patent on Nov. 10, 2022, 10 pages.
Machine assisted English translation of JPH10195085 obtained from https://patents.google.com/patent on Nov. 10, 2022, 10 pages.
Machine assisted English translation of JP2009135105 obtained from https://patents.google.com/patent on Nov. 10, 2022, 6 pages.
Machine assisted English translation of JP2012204016 obtained from https://patents.google.com/patent on Nov. 10, 2022, 6 pages.
Machine assisted English translation of JP2002170978 obtained from https://patents.google.com/patent on Nov. 10, 2022, 7 pages.
Machine assisted English translation of JP2007235013 obtained from https://patents.google.com/patent on Nov. 10, 2022, 7 pages.
Machine assisted English translation of WO2014188872 obtained from https://patents.google.com/patent on Nov. 10, 2022, 11 pages.
Machine assisted English translation of JP2018003194A obtained from <https://patents.google.com/patent> on Aug. 26, 2024, 12 pages.
Machine assisted English translation of JP2015199851A obtained from https://patents.google.com/patent on Mar. 14, 2023, 13 pages.
Machine assisted English translation of WO2015053412A1 obtained from https://patents.google.com/patent on Dec. 21, 2023, 11 pages.

* cited by examiner

CURABLE ORGANOPOLYSILOXANE COMPOSITION AND CURED PRODUCT THEREOF, PROTECTIVE AGENT OR ADHESIVE, AND ELECTRIC/ELECTRONIC DEVICE

CROSS-REFERENCE TO RELATED APPLICATIONS

This application is the U.S. National Stage of International Application No. PCT/JP2020/048201 filed on 23 Dec. 2020, which claims priority to and all advantages of U.S. Provisional Patent Application No. 62/953,609 filed on 26 Dec. 2019, the content of which is incorporated herein by reference.

TECHNICAL FIELD

The present invention relates to a curable organopolysiloxane composition and a cured product thereof, a protective agent or adhesive, and an electrical/electronic device.

BACKGROUND ART

Curable organopolysiloxane compositions are widely used as protective agents or adhesives for electrical/electronic components. As a protective agent or adhesive for electrical/electronic components, having excellent reliability and durability is important and in particular, having excellent self-adhesiveness when coming into contact with a base material prior to being fully cured is required. In recent years, electrical/electronic components have become smaller in size, more versatile, and lighter, and the shapes of the electrical/electronic components have become complex based on an application. Therefore, the curable organopolysiloxane may be used in a protective form or an adhesive form different from a conventional form, such as adhesion at a small amount, adhesion in thin film form, and the like.

Patent Document 1 discloses a composition that contains a specific organopolysiloxane containing an alkoxysilyl group and an alkenyl group as a curable organopolysiloxane that can be favorably adhered to an unwashed aluminum die cast, PPS resin, or the like. However, the composition disclosed in Patent Document 1 cannot be cured unless heated to approximately 100° C. Depending on the base material, there were cases where excellent adhesiveness was not obtained. Furthermore, when used as an adhesive in a thin film, sufficient initial adhesion and adhesive strength may not be obtained.

In order to provide a curable organopolysiloxane composition having lower temperature curability and excellent self-adhesiveness, Patent Document 2 discloses a curable organopolysiloxane composition that uses both a hydrosilylation reaction catalyst and a condensation reaction catalyst at the same time and that uses a trialkoxysilyl-containing siloxane. However, the composition disclosed in Patent Document 2 is a two-component type, and therefore, mixing two liquids immediately before use is necessary. Furthermore, the pot life after mixing was short, resulting in handling and stability problems.

Patent Document 3 discloses a one-component organopolysiloxane gel composition based on use of a β-diketone platinum complex or a platinum complex having a cyclic diene compound as a curing catalyst. However, the composition disclosed in Patent Document 3 is gelatinous, and therefore, obtaining sufficient adhesive strength for electrical/electronic components was not feasible, and the composition could not be used for applications requiring elastomer properties.

Patent document 4 discloses a self-adhesive silicone gel composition containing a platinum-based catalyst and a specific titanium compound and/or a partial hydrolysis condensation product thereof. However, the composition disclosed in Patent Document 4 is also gelatinous, and therefore, sufficient adhesive strength could not be achieved. Furthermore, Patent Document 5 discloses a curable organopolysiloxane composition containing a silanol-modified siloxane and alkoxysilanes as crosslinking agents in conjunction with simultaneously using a hydrosilylation reaction catalyst and a condensation reaction catalyst. However, a main component thereof is not an organopolysiloxane containing an alkenyl group, and does not cure sufficiently in a short period of time unless at a high temperature of 120° C. or higher. In addition, adhesion to a base material was insufficient.

Patent Document 6 discloses a UV-curable adhesive organopolysiloxane composition that uses a photo-active platinum complex catalyst as a catalyst. However, the composition disclosed in Patent Document 6 is useful for Fresnel lens materials such as concentrating solar cells and the like which require sufficient transparency, and are brittle and fragile.

RELATED ART DOCUMENTS

Patent Documents

Patent Document 1: Japanese Unexamined Patent Application 2006-348119
Patent Document 2: WO 2018/043270
Patent Document 3: WO 2014/188872
Patent Document 4: Japanese Unexamined Patent Application 2018-119021
Patent Document 5: U.S. Patent Application Publication 2014/0356620 Specification
Patent Document 6: Japanese Unexamined Patent Application 2015-110752

SUMMARY OF THE INVENTION

Problem to be Solved by the Invention

In order to resolve the conventional technical problems described above, an object of the present invention is to provide a one-component curable organopolysiloxane composition that has excellent storage stability, favorable curability and practically sufficient adhesion at relatively low temperatures, and an appropriate pot life. In particular, an object is to provide a curable organopolysiloxane composition with excellent curability at a temperature of 80° C. or lower and excellent adhesion when cured at low temperature to a poorly adhesive resin such as polycarbonate, polyphenylene sulfide, or the like as well as to metal base material. Furthermore, an object is to provide a curable organopolysiloxane composition that can be cured in a short period of time by increasing the temperature to a high temperature when rapid curing is required as needed. Furthermore, an object is to provide a curable organopolysiloxane composition that, if necessary, has a sufficient pot life for practical use in adhering work between components after UV irradiation, and has excellent curability and adhesion after a curing reaction proceeds.

Furthermore, an object of the present invention is to provide a protective agent or adhesive containing the curable organopolysiloxane composition described above, a cured product thereof, and an electrical/electronic device. In particular, an object of the present invention is to provide an electrical/electronic component having excellent reliability and durability by using the curable organopolysiloxane composition of the present invention, and thereby provide an excellent electrical/electronic device.

Means for Solving the Problem

As a result of conducting diligent research on the problems described above, the present inventors arrived at the present invention. In other words, an object of the present invention is achieved by a one-component curable organopolysiloxane composition, containing the following components (A) to (F):
(A) an organopolysiloxane having at least two alkenyl groups in each molecule thereof;
(B) an organopolysiloxane having at least two silicon atom-bonded hydrogen atoms in a molecule;
(C) a photo-active hydrosilylation reaction catalyst;
(D) a condensation reaction catalyst;
(E) a curing inhibitor; and
(F) an adhesion imparting agent having at least one terminal trialkoxysilyl group.

Component (B) is preferably included at an amount such that the molar ratio of silicon atom-bonded hydrogen atoms relative to alkenyl groups in all components of the curable organopolysiloxane composition is within a range of 0.3 to 10.

The amount of component (D) is preferably 0.5 mass % or less relative to the total mass of the curable organopolysiloxane composition.

Component (F) is preferably a trialkoxysilyl-containing siloxane having one silicon atom-bonded hydrogen atom in a molecule and having at least one trialkoxysilyl group. Component (F) is particularly preferably a trialkoxysilyl-containing siloxane expressed by the following formula:

[Formula 1]

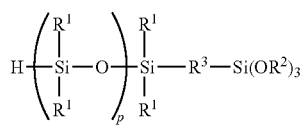

(where $R^1$ represents the same or a different monovalent hydrocarbon group not having an aliphatic unsaturated bond, $R^2$ represents an alkyl group, $R^3$ represents an alkylene group, and p is an integer of from 1 to 50).

The amount of component (F) is preferably 0.05 to 10 mass % relative to the total mass of the curable organopolysiloxane composition.

The curable organopolysiloxane composition of the present invention can further contain:
(G) an adhesion promoter.

The curable organopolysiloxane composition of the present invention can further contain:
(H) an inorganic filler.
In particular, an electrically conductive filler can be included, and silver particles or silver-coated alumina or glass microparticles can be suitably used.

The curable organopolysiloxane composition of the present invention can be preferably cured at a temperature of 80° C. or lower.

The curable organopolysiloxane composition of the present invention can preferably provide a silicone rubber composition having a JIS hardness of 5 or higher by curing.

The present invention is also related to a protective agent or adhesive for an electrical/electronic component, containing the curable organopolysiloxane composition of the present invention.

The present invention is also related to an electrically conductive or thermally conductive curable composition, containing the curable organopolysiloxane composition of the present invention.

The present invention also relates to a cured product of the curable organopolysiloxane composition of the present invention.

The present invention also relates to an electrical/electronic device having the cured product of the present invention.

The present invention is also related to an electrical/electronic device, where an electrical/electronic component is adhered, encapsulated, or sealed by the curable organopolysiloxane composition of the present invention.

Effects of the Invention

The curable organopolysiloxane composition of the present invention has excellent storage stability even when stored as one component, and can be easily cured and exhibit excellent adhesion even at relatively low temperatures of 80° C. and lower. In particular, the composition exhibits excellent adhesion to a poorly adhesive resin such as polycarbonate, polyphenylene sulfide, and the like as well as to a metal base material such as aluminum and the like even in low temperature curing conditions. In addition thereto, the curable organopolysiloxane composition of the present invention can ensure sufficient pot life for practical use in performing assembly/adhesive work between components after UV irradiation, and can be applied to a component that is difficult to irradiate with ultraviolet rays or other light after the assembly/adhering work, by performing light irradiation in advance. Furthermore, even if a large amount of an inorganic filler (particularly a conductive filler such as silver or the like) is added, excellent adhesion to resins and metal base materials is exhibited. Furthermore, if a rapid effect is required, curing can be performed in a short period of time at a higher temperature and the same performance can be exhibited as when curing at a lower temperature.

Furthermore, by using the curable organopolysiloxane composition of the present invention, reliability and durability of electrical/electronic components can be maintained over a long period of time and excellent adhesion can be exhibited. Furthermore, the curable organopolysiloxane composition of the present invention can be used as a thermally conductive material or electrically conductive material with excellent adhesion to a base material.

DESCRIPTION OF THE PREFERRED EMBODIMENT

A curable organopolysiloxane composition of the present invention is a one-component curable organopolysiloxane composition, containing the following components (A) to (F):
(A) an organopolysiloxane having at least two alkenyl groups in each molecule thereof;

(B) an organopolysiloxane having at least two silicon atom-bonded hydrogen atoms in a molecule;
(C) a photo-active hydrosilylation reaction catalyst;
(D) a condensation reaction catalyst;
(E) a curing inhibitor; and
(F) an adhesion imparting agent having at least one terminal trialkoxysilyl group.

[Component (A)]

Component (A) is an organopolysiloxane serving as a main component of the composition according to the present invention and having at least two alkenyl groups in a molecule. Such a component (A) contains an organopolysiloxane containing one or more types of alkenyl groups. Component (A) is preferably an organopolysiloxane having at least two alkenyl groups in a molecule and not having a later-described alkoxysilyl-containing group in a molecule, and component (A) is preferably added to the composition without being reacted with component (F), described later, in advance.

The molecular structure of component (A) is not particularly limited and includes, for example, straight chain, branched chain, cyclic, and three-dimensionally networked structures, and combinations thereof. Furthermore, examples of silicon atom-bonded alkenyl groups in component (A) include: vinyl groups, allyl groups, butenyl groups, pentenyl groups, and hexenyl groups, and vinyl groups and hexenyl groups are particularly preferable. Although not particularly limited thereto, examples of bonding positions of the alkenyl group include molecular chain terminals and/or molecular side chains. Furthermore, examples of groups bonded to a silicon atom other than the alkenyl group in component (A) include: alkyl groups such as methyl groups, ethyl groups, propyl groups, butyl groups, pentyl groups, hexyl groups, heptyl groups, and the like; aryl groups such as phenyl groups, tolyl groups, xylyl groups, naphthyl groups, and the like; aralkyl groups such as benzyl groups, phenethyl groups, and the like; halogenated alkyl groups such as chloromethyl groups, 3-chloropropyl groups, and 3,3,3-trifluoropropyl groups, and the like; and other substituted or unsubstituted monovalent hydrocarbon groups. Methyl groups and phenyl groups are particularly preferred. Component (A) may be a mixture of two or more having these molecular structures. In particular, the molecular structure of component (A) is preferably chain-like (including straight chain and branched chain) or resinous. Furthermore, while not particularly limited thereto, the viscosity of component (A) at 25° C. is, for example, preferably within a range of 20 to 1,000,000 mPa·s, and particularly preferably within a range of 100 to 100,000 mPa·s. This is because, if the viscosity at 25° C. is less than the lower limit of the aforementioned range, the physical properties of an obtained cured product, and particularly flexibility and elongation, may significantly decrease. In contrast, if the viscosity exceeds the upper limit of the aforementioned range, the viscosity of an obtained composition may increase, significantly deteriorating handleability.

Of such components (A), examples of straight chain organopolysiloxanes include: copolymers of dimethylsiloxanes and methylvinylsiloxanes capped at both molecular chain terminals with trimethylsiloxy groups; copolymers of dimethylsiloxane, methylvinylsiloxane, and methylphenylsiloxane capped at both molecular chain terminals with trimethylsiloxy groups; dimethylpolysiloxanes capped at both molecular chain terminals with dimethylvinylsiloxy groups; methylphenylpolysiloxanes capped at both molecular chain terminals with dimethylvinylsiloxy groups; copolymers of dimethylsiloxane and methylvinylsiloxane capped at both molecular chain terminals with dimethylvinylsiloxy groups; copolymers of dimethylsiloxane and methylvinylsiloxane capped at both molecular chain terminals with dimethylphenylsiloxy groups; copolymers of dimethylsiloxane, methylvinylsiloxane, and diphenylsiloxane capped at both molecular chain terminals with trimethylsiloxy groups; copolymers of dimethylsiloxane and diphenylsiloxane capped at both molecular chain terminals with dimethylphenylsiloxy groups; and dimethylpolysiloxanes capped at both molecular chain terminals with methylvinylphenylsiloxy groups.

Of such components (A), examples of resinous organopolysiloxanes include organopolysiloxanes having many branched siloxane units that are T units or Q units such as arbitrary combinations, which form MQ resins, MDQ resins, MTQ resins, MDTQ resins, TD resins, TQ resins, and TDQ resins, of: triorganosiloxy units (M units) (organo groups are groups selected from alkyl groups such as methyl groups, aryl groups such as phenyl groups, and alkenyl groups such as vinyl groups, same hereinafter); diorganosiloxy units (D units) (organo groups are groups selected from alkyl groups, aryl groups, and alkenyl groups); monoorganosiloxy units (T units) (organo units are groups selected from alkyl groups, aryl groups, and alkenyl groups); and siloxy groups (Q units). Note that component (A) has at least two alkenyl groups in a molecule, and may include a silanol group or an alkoxy group as well in addition to the siloxane unit described above.

[Component (B)]

Component (B) is a crosslinking agent according to the present invention and is an organopolysiloxane having at least two silicon atom-bonded hydrogen atoms in a molecule.

Component (B) reacts with component (A) to form a crosslinked structure in a cured product, and provides the cured product with flexibility, strength, and strong adhesion with a base material (adhesive durability).

Examples of molecular structures of component (B) include straight chain, partially branched straight chain, branched chain, cyclic, resinous, and networked molecular structures. Furthermore, examples of bonding positions of hydrogen atoms bonded to a silicon atom in component (B) include molecular chain terminals and/or molecular side chains. Furthermore, examples of groups bonding to the silicon atoms other than hydrogen atoms in component (B) include: alkyl groups such as methyl groups, ethyl groups, propyl groups, butyl groups, pentyl groups, hexyl groups, heptyl groups, and the like; aryl groups such as phenyl groups, tolyl groups, xylyl groups, naphthyl groups, and the like; aralkyl groups such as benzyl groups and phenethyl group; halogenated alkyl groups such as chloromethyl groups, 3-chloropropyl groups, 3,3,3-trifluoropropyl groups, and the like; and other substituted or unsubstituted monovalent hydrocarbon groups. Methyl groups or phenyl groups are particularly preferable. Furthermore, the viscosity of component (B) is not limited, but the viscosity at 25° C. is within a range of 1 to 1,000 mPa·s, preferably 1 to 500 mPa·s. Furthermore, low molecular weight siloxane oligomers (octamethyltetrasiloxane, decamethylpentasiloxane) may be reduced or eliminated from the perspective of preventing contact damage and the like.

Examples of straight chain component (B) include: dimethylpolysiloxanes capped at both molecular chain terminals with dimethylhydrogensiloxy groups; methylphenylpolysiloxanes capped at both molecular chain terminals with dimethylhydrogensiloxy groups; copolymers of dimethylsiloxane and methylphenylsiloxane capped at both molecular chain terminals with dimethylhydrogensiloxy groups; diphenylpolysiloxanes capped at both molecular chain terminals with dimethylhydrogensiloxy groups; methylhydrogenpolysiloxanes capped at both molecular chain terminals with trimethylsiloxy groups; copolymers of methylhydrogensiloxane and dimethylsiloxane capped at both molecular chain terminals with trimethylsiloxy groups; copolymers of methylhydrogensiloxane and dimethylsiloxane capped at both molecular chain terminals with dimethylhydrogensiloxy groups; and mixtures of two or more types of these organopolysiloxanes.

A cyclic component (B) is a polysiloxane configured by diorganosiloxy units and having at least two methylhydrogensiloxy units ($CH_3(H)SiO_{2/2}$), and preferable examples thereof include cyclic trisiloxanes (trimer), cyclic tetrasiloxanes (tetramer), and cyclic pentasiloxanes (pentamer). As other diorganosiloxy units, these cyclic siloxanes may be a cyclic siloxane containing one or more siloxy units selected from alkoxymethylsiloxane units ($CH_3(Alkoxy)SiO_{2/2}$), epoxy methylsiloxy units ($CH_3(Epoxy)SiO_{2/2}$), dimethylsiloxy units (($CH_3)_2SiO_{2/2}$), diphenylsiloxy units (($C_6H_5)_2SiO_{2/2}$), and phenylmethylsiloxy units (($C_6H_5)(CH_3)SiO_{2/2}$).

The resinous or three-dimensionally networked type component (B) may be, for example, an organohydrogenpolysiloxane expressed by the following average composition formula.

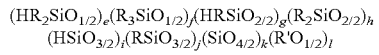
$$(HR_2SiO_{1/2})_e(R_3SiO_{1/2})_f(HRSiO_{2/2})_g(R_2SiO_{2/2})_h$$
$$(HSiO_{3/2})_i(RSiO_{3/2})_j(SiO_{4/2})_k(R'O_{1/2})_l$$

In the aforementioned average composition formula, R represents a group selected from monovalent saturated hydrocarbon groups having 1 to 12 carbon atoms and not having an aliphatic unsaturated bond, hydroxyl groups, or alkoxy groups. The monovalent saturated hydrocarbon group having 1 to 12 carbon atoms, the hydroxyl groups, and the alkoxy groups are the same as described above. R' represents a hydrogen atom or an alkyl group having 1 to 6 carbon atoms, and examples of an alkyl group having 1 to 6 carbon atoms include methyl groups, ethyl groups, propyl groups, butyl groups, hexyl groups, and the like. e, f, g, h, i, j, k, and l are numbers that satisfy the following conditions: $e+f+g+h+i+j+k=1$, $0 \leq l \leq 0.1$, and $0 < i+j+k \leq 1.0$.

Note that each of the structural units "$HR_2SiO_{1/2}$", "$R_3SiO_{1/2}$", "$HRSiO_{2/2}$", "$R_2SiO_{2/2}$", "$HSiO_{3/2}$", "$RSiO_{3/2}$" and "$SiO_{4/2}$" are partial structure units of organohydrogenpolysiloxanes called MH units, M units, DH units, D units, TH units, T units, and Q units, respectively. The resinous or three-dimensionally networked component (B) includes a branched unit selected from TH units, T units, and Q units in a molecule. "$R'O_{1/2}$" is a group that bonds with an oxygen atom in a D unit, DH unit, T unit, TH unit, or Q unit and refers to a silicon atom bonded hydroxyl group (Si—OH) in an organopolysiloxane or silicon atom-bonded alkoxy group remaining unreacted in the manufacturing of organopolysiloxane. The $M^H$ unit is primarily present at an end of a molecular chain of an organohydrogenpolysiloxane, and a $D^H$ unit is present in a molecular chain terminal of an organohydrogenpolysiloxane.

For practical purposes, preferred examples of resinous or three-dimensionally networked component (B) include:
organohydrogenpolysiloxane resins containing an $M^H$ unit, M unit, and Q unit;
organohydrogenpolysiloxane resins containing an $M^H$ unit, and/or M unit, $D^H$ unit, and Q unit;
organohydrogenpolysiloxane resins containing an $M^H$ unit, and/or M unit, D unit, and Q unit; and
organohydrogenpolysiloxane resins containing a $T^H$ unit. Note that these organohydrogenpolysiloxane resins may contain a small amount of another structural unit.

More specifically, examples of resinous or three-dimensionally networked component (B) include:
organohydrogenpolysiloxane resins containing a $(CH_3)_2HSiO_{1/2}$ unit and $SiO_{4/2}$ unit;
organohydrogenpolysiloxane resins containing a $(CH_3)_3SiO_{1/2}$ unit, $(CH_3)HSiO_{2/2}$ unit, and $SiO_{4/2}$ unit;
organohydrogenpolysiloxane resins containing a $(CH_3)_2HSiO_{1/2}$ unit, $(CH_3)_2SiO_{2/2}$ unit, and $SiO_{4/2}$ unit;
organohydrogenpolysiloxane resins containing a $(CH_3)_2HSiO_{1/2}$ unit, $SiO_{4/2}$ unit, and $(C_6H_5)SiO_{3/2}$ unit; and
organohydrogenpolysiloxane resins essentially containing a $HSiO_{3/2}$ unit and which may contain a $(CH_3)_2HSiO_{1/2}$ unit and $(CH_3)_3SiO_{1/2}$ unit.

As component (B), a chain organopolysiloxane having at least three silicon atom-bonded hydrogen atoms in a molecule is preferable, and thus a three-dimensional crosslinked structure can be densely formed between component (A) in a curing reaction of the curable organopolysiloxane composition of the present invention due to having a large number of crosslinking reaction points. Methylhydrogenpolysiloxane capped by trimethylsiloxy groups at both molecular chain terminals is preferably used.

Relative to one alkenyl group in all of the components of the curable organopolysiloxane composition, the amount of component (B) is an amount whereby silicon atom-bonded hydrogen atoms are within a range of 0.3 to 10, preferably a range of 0.5 to 3.0, and more preferably a range of 0.8 to 2.0. This is because, if the number of the aforementioned silicon atom-bonded hydrogen atoms is less than the lower limit of the aforementioned range, an obtained composition becomes no longer sufficiently cured. In contrast, if the number exceeds the upper limit of the aforementioned range, the obtained composition may generate hydrogen gas during curing, thereby significantly decreasing the heat resistance of an obtained cured product.

In the curable organopolysiloxane composition of the present invention, the amount of component (B) to 100 mass parts of component (A) is 0.1 to 30 mass parts, preferably 0.2 to 20 mass parts, and more preferably 0.5 to 10 mass parts. If component (B) is less than the lower limit of the aforementioned range, adhesion of an obtained composition in a thin layer is insufficient. In contrast, if the component exceeds the upper limit of the aforementioned range, the elastic modulus of the composition tends to decrease, while the adhesive strength tends to significantly decrease even upon a cohesive failure. Furthermore, if component (B) is less than the aforementioned lower limit, an obtained composition tends to become no longer sufficiently cured. In contrast, if the component exceeds the upper limit of the aforementioned range, the obtained composition may generate hydrogen gas during curing, causing foaming.

[Components (C) and (D)]
The curable organopolysiloxane composition according to the present invention includes, in addition to components (A) and (B) above, two different curing catalysts: (C) a photo-active hydrosilylation reaction catalyst; and (D) a condensation reaction catalyst. By using these two catalysts in combination with each of the aforementioned components, the technical effects of easy curing by heating from room temperature to 80° C. or lower and excellent adhesion to various base materials can be achieved.

Component (C) is a hydrosilylation reaction catalyst that does not exhibit activity without being irradiated with a higher energy beam, but exhibits activity in a composition by being irradiated with a high energy beam. Component (C) is a so-called high energy beam activated catalyst or photoactivated catalyst, which is known in the present technical field.

Examples of high energy beams include ultraviolet rays, gamma rays, X-rays, alpha rays, electron beams, and the like. In particular, examples include ultraviolet rays, X-rays, and electron beams irradiated from a commercially available electron beam irradiating device. Of these, ultraviolet rays are preferable from the perspective of efficiency of catalyst activation, and ultraviolet rays within a wavelength range of 280 to 380 nm are preferable from the perspective of industrial use. Furthermore, the amount of irradiation varies depending on the type of high energy beam activated catalyst, but in the case of ultraviolet rays, the integrated amount of irradiation at a wavelength of 365 nm is preferably within a range of 100 mJ/cm$^2$ to 10 J/cm$^2$.

Specific examples of component (C) include (methylcyclopentadienyl) trimethyl platinum (IV), (cyclopentadienyl) trimethyl platinum (IV), (1,2,3,4,5-pentamethyl cyclopentadienyl) trimethyl platinum (IV), (cyclopentadienyl) dimethylethyl platinum (IV), (cyclopentadienyl) dimethylacetyl platinum (IV), (trimethylsilyl cyclopentadienyl) trimethyl platinum (IV), (methoxycarbonyl cyclopentadienyl) trimethyl platinum (IV), (dimethylsilyl cyclopentadienyl) trimethylcyclopentadienyl platinum (IV), trimethyl (acetylacetonato) platinum (IV), trimethyl (3,5-heptanedionate) platinum (IV), trimethyl(methylacetoacetate) platinum (IV), bis(2,4-pentanedionato) platinum (II), bis(2,4-hexanedionato) platinum (II), bis(2,4-heptanedionato) platinum (II), bis(3,5-heptanedionato) platinum (II), bis(1-phenyl-1,3-butanedionato) platinum (II), bis(1,3-diphenyl-1,3-propanedionato) platinum (II), and bis(hexafluoroacetylacetonato) platinum (II). Of these, (methylcyclopentadienyl) trimethylplatinum (IV) and bis(2,4-pentanedionato) platinum (II) are preferred from the perspective of versatility and ease of availability.

The amount of component (C) is a catalytic amount, which depends on the type of catalyst and the type of composition, but normally metal atoms in a catalyst are preferably within a range of 1 to 500 ppm, and more preferably in the range of 5 to 200 ppm by mass relative to the curable organopolysiloxane composition.

When component (D) is used in combination with component (C), the curability and adhesiveness to various base materials of the composition according to the present invention in heating at room temperature to 80° C. can be improved. Specifically, component (D) is a condensation reaction catalyst, which promotes a condensation reaction of the aforementioned organopolysiloxane for curing. Examples of component (D) include: titanium compounds such as tetra(isopropoxy)titanium, tetra(n-butoxy)titanium, tetra(tert-butoxy)titanium, di(isopropoxy)bis(ethylacetoacetate)titanium, di(isopropoxy)bis(methylacetoacetate)titanium, titaniumtetraacetylacetonate, di(isopropoxy)bis(acetylacetonate)titanium, and the like; aluminum compounds such as aluminum alkylacetoacetate diisopropoxide, aluminum trisacetylacetone, tris(sec-butoxy)aluminum, and the like; nickel compounds such as nickel bisacetylacetonate and the like; cobalt compounds such as cobalt trisacetylacetonate and the like; zinc compounds such as zinc bisacetylacetonate and the like; and zirconium compounds such as zirconium tetra-n-propoxide, zirconium tetra-n-butoxide, zirconium tetraacetylacetonate, zirconium tributoxymonoacetylacetonate, zirconium monobutoxyacetylacetonate, zirconium dibutoxybis(ethylacetoacetate), zirconium tetraacetylacetonate, zirconium tributoxymono stearate, and the like.

The amount of component (D) is a catalytic amount, which depends on the type of catalyst and the type of composition and is preferably 0.5 mass % or less, and more preferably within a range of 0.001 to 0.500 mass % relative to the total mass of the curable organopolysiloxane composition.

Component (E)

The curable organopolysiloxane composition of the present invention contains a curing inhibitor as a component to improve storage stability and handling workability and to improve pot life. Examples of component (E) include: acetylene based compounds such as 2-methyl-3-butyne-2-ol, 3,5-dimethyl-1-hexin-3-ol, 2-phenyl-3-butyne-2-ol, 1-ethynyl-1-cyclohexanol, 1-ethynyl-2-cyclohexanol, and the like; enyne compounds such as 3-methyl-3-pentene-1-in, 3,5-dimethyl-3-hexene-1-in, and the like; 1,3,5,7-tetramethyl-1,3,5,7-tetravinylcyclotetrasiloxane, 1,3,5,7-tetramethyl-1,3,5,7-tetrahexenylcyclotetrasiloxane, triazoles such as benzotriazole, phosphines, mercaptans, hydrazines, and the like.

The amount of component (E) should be appropriately selected based on curing conditions of the curable organopolysiloxane composition of the present invention and is preferably 0.001 to 1.0 mass %, and more preferably 0.01 mass % to 0.8 mass % relative to the total mass of the curable organopolysiloxane composition. In particular, the amount of the compound having a carbon-carbon triple bond in a molecule in component (E) is preferably less than 0.5 mass %, and more preferably less than 0.3 mass % of the total mass of the curable organopolysiloxane composition. The compound having a carbon-carbon triple bond in a molecule in component (E) may not be included.

[Component (F)]

Component (F) is an adhesion imparting agent having at least one terminal trialkoxysilyl group, and is a component that improves adhesion of a cured silicone rubber product obtained by curing the curable organopolysiloxane composition of the present invention. Component (F) has a trialkoxysilyl group, thereby providing excellent reactivity, with a plurality of condensation reaction functional groups reacting simultaneously. Therefore, in addition to low-temperature adhesion, even small amounts of the adhesive form can achieve strong and flexible adhesion to a base material.

The trialkoxysilyl group is preferably a trimethoxysilyl group or triethoxysilyl group. Furthermore, the structure of component (F) other than the trialkoxysilyl group is not particularly limited. Furthermore, a plurality of components can also be used in combination.

Examples of component (F) include 3-glycisoxypropyl trimethoxysilane, 2-(3,4-epoxycyclohexyl)ethyltrimethoxysilane, bis(trimethoxysilyl)ethane, 1,2-bis(trimethoxysilyl)ethane, 1,2-bis(triethoxysilyl)ethane, 1,1-bis(trimethoxysilyl)ethane, 1,4-bis(trimethoxysilyl)butane, 1,4-bis(triethoxysilyl)butane, 1-methyldimethoxysilyl-4-trimethoxysilylbutane, 1-methyldiethoxysilyl-4-triethoxysilylbutane, 1,5-bis(trimethoxysilyl)pentane, 1,5-bis(triethoxysilyl)pentane, 1,4-bis(trimethoxysilyl)pentane, 1,4-bis(triethoxysilyl)pentane, 1-methyldimethoxysilyl-5-trimethoxysilylpentane, 1-methyldiethoxysilyl-5-triethoxysilylpentane, 1,6-bis(trimethoxysilyl)hexane, 1,6-bis(triethoxysilyl)hexane, 1,4-bis(trimethoxysilyl)hexane, 1,5-bis(trimethoxysilyl)hexane, 2,5-bis(trimethoxysilyl)hexane, 1-methyldimethoxysilyl-6-trimethoxysilylhexane, 1-phenyldiethoxysilyl-6-triethoxysilylhexane, 1,7-bis(trimethoxysilyl)heptane, 2,5-bis(trimethoxysilyl)heptane, 2,6-bis(trimethoxysilyl)heptane, 1,8-bis(trimethoxysilyl)octane, 2,5-bis(trimethoxysilyl)octane, 2,7-bis(trimethoxysilyl)octane, 1,9-bis(trimethoxysilyl)nonane, 2,7-bis(trimethoxysilyl)nonane, 1,10-bis(trimethoxysilyl)decane, 3,8-bis(trimethoxysilyl)decane, methyltrimethoxysilane, methyltriethoxysilane, ethyltrimethoxysilane, ethyltriethoxysilane, vinyltrimethoxysilane, phenyltrimethoxysilane, 3-methacryloxypropyltrimethoxysilane, 3-methacryloxypropyltriethoxysilane, and 3-acryloxypropyltrimethoxysilane.

Of the components (F) above, an organoalkoxysilane containing an amino group and an organoalkoxysilane containing an epoxy group may be a reaction mixture thereof, and such components can provide initial adhesion to various base materials in contact during a curing process, and particularly low-temperature adhesion even to an unwashed adherend. In the reaction mixture, the ratio of the alkoxysilane having an amino group-containing organic group to the alkoxysilane having an epoxy group-containing organic group is, in terms of molar ratio, preferably within a range of (1:1.5) to (1:5), and particularly preferably within a range of (1:2) to (1:4). The reaction mixture can be easily synthesized by mixing the alkoxysilane having an amino group-containing organic group and alkoxysilane having an epoxy group-containing organic group to cause a reaction at room temperature or by heating.

When an alkoxysilane having an amino group-containing organic group is reacted with an alkoxysilane having an epoxy group-containing organic group by the method described in JP 10-195085 A, the present invention can contain a carbasilatrane derivative expressed by the general formula:

[Formula 2]

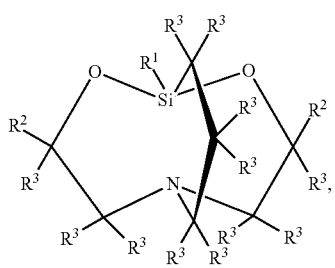

{where $R^1$ represents an alkyl group or an alkoxy group, $R^2$ represents the same or different group selected from a group consisting of groups expressed by the general formula:

[Formula 3]

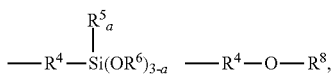

(where $R^4$ represents an alkylene group or alkyleneoxyalkylene group, $R^5$ represents a monovalent hydrocarbon group, $R^6$ represents an alkyl group, $R^7$ represents an alkylene group, $R^8$ represents an alkyl group, alkenyl group, or acyl group, and a is 0, 1, or 2), and $R^3$ represents the same or different hydrogen atom or alkyl group}, which is obtained by cyclizing by an alcohol exchange reaction.

Examples of such carbasilatrane derivatives include silatrane derivatives having an alkenyl group and silicon atom-bonded alkoxy group in one molecule expressed by the following structure.

[Formula 4]

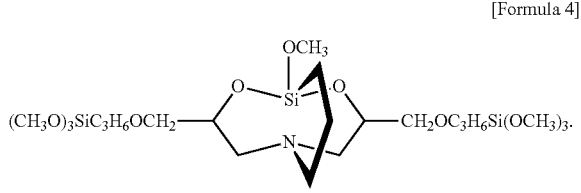

Component (F) is particularly preferably a trialkoxysilyl-containing siloxane having one silicon atom-bonded hydrogen atom in a molecule and having at least one trialkoxysilyl group. The trialkoxysilyl-containing siloxane can be added and mixed with the adhesion imparting agent with at least one terminal trialkoxysilyl group listed above. The trialkoxysilyl-containing siloxane has silicon atom-bonded hydrogen atoms in a molecule, and therefore reacts with component (A) together with another crosslinking agent (component (B)) during the curing reaction and is incorporated into a cured product. Herein, at least a portion of component (F) may be mixed with component (A) in advance and then subjected to an addition reaction, or may be blended as a separate component. Furthermore, a group other than the silicon atom-bonded hydrogen atoms and alkoxysilyl groups in component (F) in this case is preferably a non-reactive functional group selected from alkyl groups and aryl groups.

Preferably, component (F) is an alkoxysilyl-containing siloxane having a silicon atom-bonded hydrogen atom and an alkoxysilyl group at both terminals of a polysiloxane expressed by the following formula.

[Formula 5]

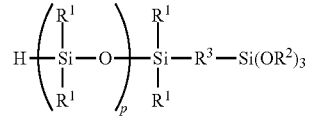

(where $R^1$ represents the same or different monovalent hydrocarbon group not having an aliphatic unsaturated bond, $R^2$ represents an alkyl group, $R^3$ represents an alkylene group, and p is an integer from 1 to 50).

In the above formula, $R^1$ represents the same or different monovalent hydrocarbon group not having an aliphatic unsaturated bond, and examples thereof include: alkyl groups such as a methyl group, ethyl group, propyl group, butyl group, pentyl group, hexyl group, heptyl group, octyl group, nonyl group, decyl group, octadecyl group, and the like; cycloalkyl groups such as a cyclopentyl group, cyclohexyl group, and the like; aryl groups such as a phenyl group, tolyl group, xylyl group, naphthyl group, and the like; aralkyl groups such as a benzyl group, phenethyl group, phenylpropyl group, and the like; and halogenated alkyl groups such as a 3-chloropropyl group, 3,3,3-trifluoropropyl group, and the like. Alkyl groups and aryl groups are preferable, and methyl groups and phenyl groups are particularly preferable. Furthermore, in the above formula, $R^2$ represents an alkyl group, and examples thereof include methyl groups, ethyl groups, propyl groups, butyl groups, pentyl groups, and hexyl groups. Methyl groups and ethyl groups are preferable. $R^3$ represents an alkylene group, preferably an alkylene group having 2 to 10 carbon atoms, and particularly preferably an ethylene group or propylene group. Moreover, in the above formula, p is an integer of 1 to 50, preferably an integer of 1 to 10, particularly preferably an integer of 1 to 5.

Examples of such component (F) include alkoxysilyl-containing siloxanes expressed by the formula:

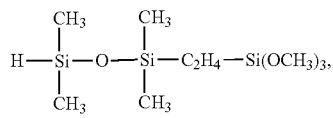
[Formula 6]

alkoxysilyl-containing siloxanes expressed by the formula:

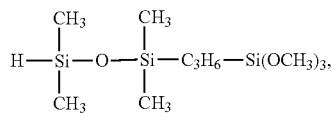
[Formula 7]

alkoxysilyl-containing siloxanes expressed by the formula:

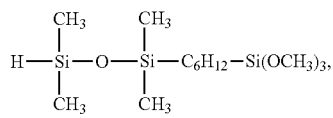
[Formula 8]

and
alkoxysilyl-containing siloxanes expressed by the formula:

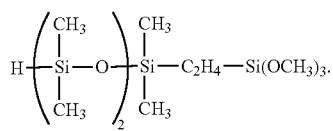
[Formula 9]

One of these alkoxysilyl-containing siloxanes may be used or two or more thereof may be used in combination, or a portion of or all methyl groups may be substituted with another alkyl group, halogenated alkyl group, aryl group, or the like.

From the perspective of technical effects, component (F) is preferably a trimethoxysilyl group-containing disiloxane expressed by the formula:

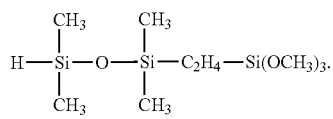
[Formula 10]

More specifically, relative to the overall curable organopolysiloxane composition, the amount of the organopolysiloxane having an alkoxysilyl-containing group expressed by the general formula with at least one silicon atom bond in a molecule:

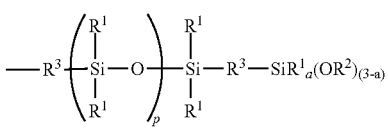
[Formula 11]

(wherein, $R^1$ represents the same or different monovalent hydrocarbon group not having an aliphatic unsaturated bond, $R^2$ represents an alkyl group, $R^3$ represents the same or different alkylene group, a is an integer of 0 to 2, and p is an integer of 1 to 50) is less than 5.0 mass %, preferably less than 3.0 mass %, and more preferably less than 1.0 mass %.

Most preferably, the composition according to the present invention does not contain an organopolysiloxane having an alkoxysilyl-containing group similar to that described above. Note that in the examples of functional groups exemplified above, $R^1$, $R^2$, and $R^3$, a and p are the same as each of the functional groups in component (F).

Such an organopolysiloxane having an alkoxysilyl-containing group may be temporarily formed in an addition reaction between component (A) and component (F) having a silicon atom-bonded hydrogen atom in accordance with the progress of a curing reaction of the curable organopolysiloxane composition of the present invention, but progresses as a competitive reaction with another crosslinking agent (components (B) and the like) in the curing reaction, unlike the addition of a pre-reactant. From this, it is assumed that unlike the addition of an equivalent amount of the pre-reactant to the composition, technical effects of improving adhesive properties and the like are exerted as a result of a random (non-selective) progress of the reaction between component (F) having a silicon atom-bonded hydrogen atom and component (A) concurrently with another crosslinking reaction.

Relative to the total mass of the curable organopolysiloxane composition, the amount of component (F) is preferably 0.05 to 10 mass %, and more preferably 0.1 to 5.0 mass %.

[Component (G)]

Component (G) is a component that provides favorable adhesion to the crosslinked product of the composition described above differing from component (F) and is preferably at least one type of adhesion promoter selected from a group consisting of: (i) siloxanes having at least one each of a silicon atom-bonded alkenyl group or a silicon atom-bonded hydrogen atom and a silicon atom-bonded alkoxy group in a molecule; (ii) organosiloxanes having at least one each of a silicon atom-bonded alkenyl group, a silicon atom-bonded alkoxy group, and a silicon atom-bonded epoxy-containing monovalent organic group in a molecule; (iii) mixtures or reaction mixtures of a silane or siloxane having at least one silicon atom-bonded alkoxy group in a molecule and an organosiloxane having at least one each of a silicon atom-bonded hydroxy group and a silicon atom-bonded alkenyl group in a molecule; (iv) mixtures or reaction mixtures of an organosilane or organosiloxane having at least one each of a silicon atom-bonded alkoxy group and a silicon atom-bonded epoxy group-containing monovalent organic group in a molecule and an organosiloxane having at least one each of a silicon atom-bonded hydroxy group and a silicon atom-bonded alkenyl group in a molecule; and (v) an alkoxyalkoxysilane.

Of components (G), examples of molecular structures of the siloxane having in a molecule at least one each of a silicon atom-bonded alkenyl group or a silicon atom-bonded hydrogen atom and a silicon atom-bonded alkoxy group include: straight chain, partially branched straight chain, branched chain, cyclic, and networked. Straight chain, branched chain, and networked are particularly preferable. Examples of silicon atom-bonded alkenyl groups in the siloxane include: vinyl groups, allyl groups, butenyl groups, pentenyl groups, and hexenyl groups. Vinyl groups are particularly preferable. Furthermore, examples of the silicon atom-bonded alkoxy groups in the siloxane include: methoxy groups, ethoxy groups, propoxy groups, butoxy groups, and methoxyethoxy groups. Methoxy groups are particularly preferable. Furthermore, examples of silicon atom-bonded groups other than alkenyl groups, hydrogen atoms, and alkoxy groups in this siloxane include: alkyl groups such as methyl groups, ethyl groups, propyl groups, butyl groups, pentyl groups, hexyl groups, heptyl groups, and the like; aryl groups such as phenyl groups, tolyl groups, xylyl groups, naphthyl groups, and the like; aralkyl groups such as benzyl groups, phenethyl groups, and the like; halogenated alkyl groups such as chloromethyl groups, 3-chloropropyl groups, 3,3,3-trifluoropropyl groups, and the like other substituted or unsubstituted monovalent hydrocarbon groups; glycydoxyalkyl groups such as 3-glycidoxypropyl groups, 4-glycidoxybutyl groups, and the like; (3,4-epoxycyclohexyl) alkyl groups such as 2-(3,4-epoxycyclohexyl) ethyl groups, 3-(3,4-epoxycyclohexyl) propyl groups, and the like; oxylanyl alkyl groups such as 4-oxylanylbutyl groups, 8-oxylanyloctyl groups, and the like; and other epoxy-containing monovalent organic groups. Favorable adhesion can be provided on various types of base materials, and therefore, at least one epoxy-containing monovalent organic group is preferably included in a molecule. The viscosity of such a siloxane is not limited, but is preferably 1 to 500 mPa-s at 25° C.

Furthermore, of the components (G), with regard to the mixture of silanes or siloxanes with at least one silicon atom-bonded alkoxy group in a molecule and organosiloxanes having at least one silicon atom-bonded hydroxy group and silicon atom-bonded alkenyl group in a molecule, examples of the alkoxy groups bonded to silicon atoms in the former, or silanes, include: methoxy groups, ethoxy groups, propoxy groups, butoxy groups, and methoxyethoxy groups. Methoxy groups are particularly preferable. Furthermore, in addition to the alkoxy group described above, the silicon atom of the silane may contain at least one group selected from: alkyl groups such as methyl groups, ethyl groups, propyl groups, butyl groups, pentyl groups, hexyl groups, heptyl groups, and the like; alkenyl groups such as vinyl groups, allyl groups, butenyl groups, pentenyl groups, hexenyl groups, and the like; aryl groups such as phenyl groups, tolyl groups, xylyl groups, naphthyl groups, and the like; aralkyl groups such as benzyl groups, phenethyl groups, and the like; halogenated alkyl groups such as chloromethyl groups, 3-chloropropyl groups, 3,3,3-trifluoropropyl groups, and the like; other substituted or unsubstituted monovalent hydrocarbon groups; glycydoxyalkyl groups such as 3-glycidoxypropyl groups, 4-glycidoxybutyl groups, and the like; (3,4-epoxycyclohexyl) alkyl groups such as 2-(3,4-epoxycyclohexyl) ethyl groups and 3-(3,4-epoxycyclohexyl) propyl groups, and the like; oxylanyl alkyl groups such as 4-oxylanylbutyl groups, 8-oxylanyloctyl groups, and the like; and other epoxy containing monovalent organic groups. Favorable adhesion can be provided on various base materials, and therefore, at least one epoxy containing monovalent organic group is preferably included in a molecule.

Furthermore, examples of the molecular structure of the former, or siloxane, include: straight chain, partially branched straight chain, branched chain, cyclic, and networked, and straight chain, branched chain, and networked are particularly preferable. Examples of alkoxy groups bonded to a silicon atom in a siloxane include: methoxy groups, ethoxy groups, propoxy groups, butoxy groups, and methoxyethoxy groups. Methoxy groups are particularly preferable. Furthermore, in addition to the alkoxy groups described above, the silicon atom of the siloxane may contain at least one group selected from: alkyl groups such as methyl groups, ethyl groups, propyl groups, butyl groups, pentyl groups, hexyl groups, heptyl groups, and the like; alkenyl groups such as vinyl groups, allyl groups, butenyl groups, pentenyl groups, hexenyl groups, and the like; aryl groups such as phenyl groups, tolyl groups, xylyl groups, naphthyl groups, and the like; aralkyl groups such as benzyl groups, phenethyl groups, and the like; halogenated alkyl groups such as chloromethyl groups, 3-chloropropyl groups, 3,3,3-trifluoropropyl groups, and the like; other substituted or unsubstituted monovalent hydrocarbon groups; glycydoxyalkyl groups such as 3-glycidoxypropyl groups, 4-glycidoxybutyl groups, and the like; (3,4-epoxycyclohexyl) alkyl groups such as 2-(3,4-epoxycyclohexyl) ethyl groups and 3-(3,4-epoxycyclohexyl) propyl groups, and the like; oxylanyl alkyl groups such as 4-oxylanylbutyl groups, 8-oxylanyloctyl groups, and the like; and other epoxy containing monovalent organic groups. Favorable adhesion can be provided on various base materials, and therefore, at least one epoxy containing monovalent organic group is preferably in a molecule. The viscosity of such a siloxane is not limited, but is preferably 1 to 500 mPa-s at 25° C.

Furthermore, examples of the molecular structure of the latter, or organosiloxane, include: straight chain, partially branched straight chain, branched chain, cyclic, and networked, and straight chain, branched chain, and networked are particularly preferable. Examples of alkenyl groups bonded to silicon atoms in the organosiloxane include: vinyl groups, allyl groups, butenyl groups, pentenyl groups, and hexenyl groups. Vinyl groups are particularly preferable. Furthermore, examples of groups bonded to a silicon atom other than hydroxy groups and alkenyl groups in the organosiloxane include: alkyl groups such as methyl groups, ethyl groups, propyl groups, butyl groups, pentyl groups, hexyl groups, heptyl groups, and the like; aryl groups such as phenyl groups, tolyl groups, xylyl groups, naphthyl groups, and the like; aralkyl groups such as benzyl groups and phenethyl groups; halogenated alkyl groups such as chloromethyl groups, 3-chloropropyl groups, 3,3,3-trifluoropropyl groups, and the like; and other substituted or unsubstituted monovalent hydrocarbon groups. The viscosity of such organosiloxanes is not limited, but is preferably with a range of 1 to 500 mPa-s at 25° C.

Although not limited, the ratio of silanes or siloxanes having at least one silicon atom-bonded alkoxy group in a molecule to organosiloxanes having at least one silicon atom-bonded hydroxy group and one silicon atom-bonded alkenyl group in a molecule is such that particularly favorable adhesion can be provided. Therefore, the weight ratio of the former silane or siloxane to the latter organosiloxane is preferably within a range of 1/99 to 99/1.

A reaction mixture of alkoxysilane having an amino group-containing organic group and alkoxysilane having an epoxy group-containing organic group can be used as the adhesion imparting agent of the present invention, and the reaction ratio is preferably, in terms of molar ratio, within a range of (1:1.5) to (1:5), and particularly preferably within a range of (1:2) to (1:4). The component can be easily synthesized by mixing the alkoxysilane having an amino group-containing organic group and alkoxysilane having an epoxy group-containing organic group as described above to cause a reaction under room temperature or by heating.

In particular, when an alkoxysilane having an amino-group containing organic group is reacted with an alkoxysilane having an epoxy-group containing organic group by the method described in JP 10-195085 A, the present invention particularly preferably contains a carbasilatrane derivative expressed by the general formula:

[Formula 12]

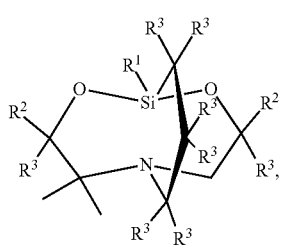

{where $R^1$ represents an alkyl group or an alkoxy group, $R^2$ represents the same or different group selected from the group consisting of groups expressed by the general formula:

[Formula 13]

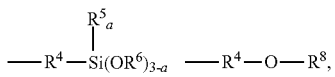

(where $R^4$ represents an alkylene group or alkyleneoxyalkylene group, $R^5$ represents a monovalent hydrocarbon group, $R^6$ represents an alkyl group, $R^7$ represents an alkylene group, $R^8$ represents an alkyl group, alkenyl group, or acyl group, and a is 0, 1, or 2), and $R^3$ represents the same or different hydrogen atom or alkyl group}, which is obtained by cyclizing by an alcohol exchange reaction.

Examples of such carbasilatrane derivatives include silatrane derivatives having an alkenyl group and silicon atom-bonded alkoxy group in one molecule expressed by the following structure.

[Formula 14]

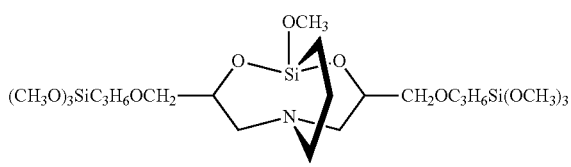

The component is an organic compound having at least two alkoxysilyl groups in a molecule, in addition to containing bonds other than a silicon-oxygen bond between these silyl groups, and serves to independently improve initial adhesion and improve the adhesive durability of a cured product including this adhesion promoter under harsh conditions particularly when used in combination with another adhesion imparting agent.

The alkoxyalkoxysilane serving as component (G) is a component that is generally used as a silane coupling agent, a crosslinking agent for a condensation reaction, or the like, and is a component selected from alkoxytrialkoxysilanes, dialkyldialkoxysilanes, and trialkylalkoxysilanes. Specific examples preferably include methyltrimethoxysilanes, hexyltrimethoxysilanes, octyltrimethoxysilanes, decyltrimethoxysilanes, similar products, and the like.

The blending amount of component (G) is an amount sufficient to provide favorable adhesion to a crosslinked product of the composition described above and, for example, is preferably within a range of 0.01 to 20 mass parts, and particularly preferably within a range of 0.1 to 10 mass parts, with regard to 100 mass parts of component (A). This is because if the blending amount of component (G) is less than this range, adhesive properties of the cured product tend to decrease, while if the amount exceeds this range, the adhesive properties are not affected, but rather the stability of a resulting silicone elastomer tends to decrease.

[Component (H)]

The curable organopolysiloxane composition according to the present invention may optionally further contain (H) an inorganic filler within a scope where the curing properties of the photo-active hydrosilylation reaction catalyst are not impaired. If included, the inorganic filler is preferably one or more types selected from reinforcing fillers, thermally conductive fillers, and electrically conductive fillers. In particular, the curable organopolysiloxane composition according to the present invention has an advantage of having favorable adhesion to resins and metal base materials at low temperatures and short curing reaction times, even when a large amount of the inorganic filler, and particularly thermally conductive filler or electrically conductive filler, such as silver powder, silver-coated microparticles, or the like, is added.

The reinforcing filler is a component for providing mechanical strength to a silicone rubber cured product obtained by curing the curable organopolysiloxane composition of the present invention and improving performance as a protective agent or an adhesive. Examples of such reinforcing fillers include: inorganic fillers such as fumed silica fine powder, precipitated silica fine powder, calcined silica fine powder, fumed titanium dioxide fine powder, quartz fine powder, calcium carbonate fine powder, diatomaceous earth fine powder, aluminum oxide fine powder, aluminum hydroxide fine powder, zinc oxide fine powder, zinc carbonate fine powder, and the like. The reinforcing fillers may contain inorganic fillers obtained by surface treating these inorganic fillers with a treating agent methyltrimethoxysilane and other organoalkoxysilanes; trimethylchlorosilane and other organohalosilanes; hexamethyldisilazane and organosilanes; α,ω-silanol group-capped dimethylsiloxane oligomer, α,ω-silanol group-capped methylphenylsiloxane oligomer, α,ω-silanol group-capped methylvinylsiloxane oligomer, and other siloxane oligomers; and the like.

While not particularly limited thereto, the particle diameter of fine powder of the reinforcing filler may be, for example, within the range of 0.01 μm to 1000 μm at the median diameter based on the laser diffraction/scattering type particle size distribution measurement.

The amount of the reinforcing filler is not particularly limited so long as the curing properties of the photo-active hydrosilylation reaction catalyst is not impaired, but is preferably 0.1 to 200 mass % and more preferably 1 to 100 mass %, relative to the total mass of the curable organopolysiloxane composition excluding component (H).

The optional thermally conductive filler or electrically conductive filler is a component that provides thermal conductivity or electrical conductivity to a silicone rubber cured product obtained by curing the curable organopolysiloxane composition of the present invention, and is preferably at least one type of powder and/or fiber selected from a group consisting of pure metals, alloys, metal oxides, metal hydroxides, metal nitrides, metal carbides, metal silicates, carbon, soft magnetic alloys and ferrites. A metal powder, metal oxide powder, metal nitride powder, or carbon powder is suitable.

Pure metals include: bismuth, lead, tin, antimony, indium, cadmium, zinc, silver, copper, nickel, aluminum, iron, and silicon metal. Alloys include: an alloy including two or more metals selected from the group consisting of bismuth, lead, tin, antimony, indium, cadmium, zinc, silver, aluminum, iron, and silicon metal. Metal oxides include: alumina, zinc oxide, silicon oxide, magnesium oxide, beryllium oxide, chromium oxide, and titanium oxide. Metal hydroxides include: magnesium hydroxide, aluminum hydroxide, barium hydroxide, and calcium hydroxide. Metal nitrides include: boron nitride, aluminum nitride, and silicon nitride. Metal carbides include: silicon carbide, boron carbide, and titanium carbide. Metal silicides include: magnesium silicide, titanium silicide, zirconium silicide, tantalum silicide, niobium silicide, chromium silicide, tungsten silicide, and molybdenum silicide. Carbons include: diamond, graphite, fullerene, carbon nanotubes, graphene, activated carbon, and amorphous carbon black. Soft magnetic alloys include: Fe—Si alloy, Fe—Al alloy, Fe—Si—Al alloy, Fe—Si—Cr alloy, Fe—Ni alloy, Fe—Ni—Co alloy, Fe—Ni—Mo alloy, Fe—Co alloy, Fe—Si—Al—Cr alloy, Fe—Si—B alloy, and Fe—Si—Co—B alloy. Ferrites include: Mn—Zn ferrite, Mn—Mg—Zn ferrite, Mg—Cu—Zn ferrite, Ni—Zn ferrite, Ni—Cu—Zn ferrite, and Cu—Zn ferrite. Furthermore, examples thereof include fine powder obtained by depositing or plating a metal such as gold, silver, nickel, copper, or the like on the surface of fine powder of ceramic, glass, quartz, organic resin, or the like.

Note that silver powder, glass coated with a metal such as silver or the like, fine powder of aluminum oxide or the like, aluminum powder, aluminum oxide powder, zinc oxide powder, aluminum nitride powder, or graphite are preferable. Furthermore, when electrical insulation is required for the present composition, a metal oxide powder or a metal nitride powder is preferable, and silver powder, aluminum oxide powder, zinc oxide powder, or aluminum nitride powder are particularly preferable.

The particle shape of the thermally conductive filler or electrically conductive filler is not particularly limited, and examples thereof include spherical, needle-like, disc-like, rod-like, and irregular particle shapes. Spherical and irregular shapes are preferable. Furthermore, the average particle diameter of component (H) is not particularly limited, but is preferably within a range of 0.01 to 500 µm, and more preferably within a range of 0.01 to 300 µm.

The thermally conductive filler or the electrically conductive filler is preferably heated and mixed with component (F) and the like described above at a temperature of 100 to 200° C. under reduced pressure. In particular, if component (F) is a siloxane having an alkoxysilyl-containing group, in some cases, surface treatment of the thermally conductive filler or electrically conductive filler can provide a composition having low viscosity and excellent handling workability even if filled at a high amount.

The blending amount of such thermally conductive filler or electrically conductive filler is not particularly limited, but is preferably 0.1 to 3,000 mass %, and more preferably 1 to 1,500 mass % with regard to the total mass of the curable organopolysiloxane composition excluding component (H). This is because even if the composition of the curable organopolysiloxane composition containing components (A) to (E) of the present invention includes a large amount of the thermally conductive filler or electrically conductive filler, in particular through the combined use of component (C) and component (D), favorable adhesion to a base material can be achieved through a curing reaction at low temperature and over a short period of time.

Furthermore, the curable organopolysiloxane composition of the present invention may also optionally contain: an organic solvent such as toluene, xylene, acetone, methyl ethyl ketone, methyl isobutyl ketone, hexane, heptane, and the like; a non-crosslinkable diorganopolysiloxane such as α,ω-trimethylsiloxy group-capped dimethylpolysiloxane, a, w-trimethylsiloxy group-capped methylphenylpolysiloxane, and the like; a flame retardant such as carbon black and the like; an antioxidant such as hindered phenol-type antioxidants; a heat resistant agent such as iron oxide; a plasticizer such as dialkylsiloxane oligomers capped at both molecular chain terminals with hydroxydialkylsiloxane groups; and a pigment, a thixotropy imparting agent, and an antifungal agent, so long as the object of the present invention is not impaired.

The curable organopolysiloxane composition according to the present invention can be manufactured by uniformly mixing the organopolysiloxanes, two different curing catalysts, an adhesion promoter, and another arbitrary component. Although not particularly limited, a conventionally known method can be used for the method of mixing the components of the organopolysiloxane composition, but a uniform mixture is generally obtained by simple stirring. Furthermore, if a solid component such as an inorganic filler or the like is contained as an arbitrary component, mixing using a mixing device is more preferable. While not particularly limited thereto, examples of mixing devices include: single- or twin-screw continuous mixers, double rollers, Ross mixers, Hobart mixers, dental mixers, planetary mixers, kneader mixers, Henschel mixers, cartridge mixers, and the like.

The curable organopolysiloxane composition of the present invention can be used as a one-component curable organopolysiloxane composition and is stable and durable even when stored in a one-component state.

Specifically, the curable organopolysiloxane composition of the present invention can be produced by uniformly mixing components (A) to (E), and components (F) to (H) as needed, as well as another arbitrary component while blocking moisture. The manufactured curable organopolysiloxane compositions can quickly be cured by heating from room temperature to 80° C. to form a silicone rubber. Furthermore, the curing rate can be further accelerated by heating to a temperature exceeding 80° C.

The curable organopolysiloxane composition of the present invention is favorably adhered to various adherends or base bodies. Examples of adherends or base bodies include glass, ceramics, mortars, concrete, woods, aluminum, copper, brass, zinc, silver, stainless steels, iron, galvanized iron, tin plates, nickel plating surfaces, epoxy resins, phenol resins, and other adherends or base bodies. Furthermore, examples include adherend or base bodies such as polycarbonate resins, polyester resins, ABS resins, nylon resins, polyvinyl chloride resins, polyphenylene sulfide resins, polyphenylene ether resins, polybutylene terephthalate resins, and other thermoplastic resins. Furthermore, if stronger adhesion is required, the aforementioned adhesion promoter may be added. In addition, an appropriate primer may be coated on a surface of the adherends or base bodies, and the curable organopolysiloxane composition according to the present invention may be adhered to the primer-coated surface.

A method of applying the curable organopolysiloxane composition of the present invention to the adherend or base body is not limited and can be performed by coating or dispensing. For example, a method of coating such as gravure coating, offset coating, offset gravure, roll coating, air knife coating, curtain coating, comma coating, bar coating or the like can be used, or a dispenser using a dispensing method such as a syringe method, volumetric metering, a non-contact method, a tubing method, a plunger method, or the like to apply a small amount of a composition in a specific location can be used.

The curable organopolysiloxane composition of the present invention is suitable as a building member and as a sealing material, potting material, sealing material, or adhesive for electrical/electronic components and automotive components. Specifically, the composition can suitably be used as a sealing agent for adhering glass, a sealing material of a bathtub unit, an adhesive and sealing material for illumination components of a vehicle such as an automobile or the like, a protective agent or adhesive of electrical/ electronic components (sealing material, coating material, potting agent, or adhesive), and the like.

The curable organopolysiloxane composition according to the present invention has an excellent effect of improving initial adhesion to various base materials to which contact is made during curing, particularly to metal base materials such as an uncleaned aluminum die cast, organic resins such as polybutylene terephthalate (PBT) resin, polyphenylene sulfide (PPS) resin, polycarbonate (PC) resin, and the like, has particularly excellent adhesive durability and can achieve high adhesive strength after curing, and thus is particularly useful as a protective agent or adhesive composition of electrical/electronic components. Furthermore, the curable organopolysiloxane composition of the present invention can be cured at relatively low temperatures, and therefore are particularly suitable for use as protective agents or adhesives for plastic components that do not have heat resistance, adhesives for optical components such as IR filters, camera lenses, and the like that are susceptible to deterioration due to deformation, as well as protective agents or adhesives for electrical/electronic components such as motors, coils, and the like that use magnets or microphones, speakers, and the like that are susceptible to magnetic effects.

Similarly, the curable organopolysiloxane composition according to the present invention does not have a problem with curing failures even if a large amount of the inorganic filler, and particularly a large amount of a thermally conductive filler or electrically conductive filler such as silver powder, microparticles coated with silver, or the like, is added, and thus has an excellent effect of improving initial adhesion to various base materials to which contact is made during a curing process. After curing, the composition has excellent adhesion durability and can achieve high adhesive strength, and therefore is useful as a thermally conductive or electrically conductive curable composition (for example, protective agent or adhesive as described above).

The curable organopolysiloxane composition of the present invention can form a cured product by irradiating with a high energy beam such as ultraviolet rays or the like to activate the hydrosilylation catalyst, which is component (D), such that the hydrosilylation reaction in the composition proceeds. The types of high energy beams are as described above. The amount of irradiation depends on the type of component (D), but in the case of ultraviolet rays, the integrated irradiation amount at 365 nm is preferably within a range of 100 mJ/cm$^2$ to 100 J/cm$^2$, may be within a range of 500 mJ/cm$^2$ to 50 J/cm$^2$, and may be within a range of 500 mJ/cm$^2$ to 20 J/cm$^2$. In other words, the curable organopolysiloxane composition of the present invention can initiate a curing reaction triggered by irradiation with a high energy beam such as ultraviolet rays or the like. Note that the hydrosilylation catalyst serving as component (D) can be cured at a relatively low temperature because once activated, a curing reaction proceeds over time at room temperature and the like to form a cured product even after irradiation of the high energy beam is stopped, and thus curing is feasible at a temperature of 80° C. or lower, and at room temperature (25° C.) to 80° C. Although the curable silicone composition of the present invention can be cured at room temperature or by heating, heating at a low temperature may be simultaneously performed in order to perform rapid curing. The heating temperature is preferably within a range of room temperature to 10° C., and more preferably 40 to 80° C. Note that the curable organopolysiloxane composition of the present invention has an advantage where, if irradiated with a high energy beam such as ultraviolet rays or the like, a favorable curing reaction can proceed without heating, particularly at temperatures exceeding 120° C., and where initial adhesion and strong adhesive strength can be achieved. Furthermore, as described later, catalytic activity of component (D) does not occur unless irradiated with a high energy beam such as UV light or the like, and therefore, the curable organopolysiloxane composition of the present invention can be stored stably as a one-component composition at a low temperature (particularly −20° C. to 5° C.). Note that if a faster curing rate is required, curing can be performed by increasing the amount of irradiation of the high energy beam or by heating to over 80° C.

In addition thereto, the curable organopolysiloxane composition of the present invention, in which the hydrosilylation catalyst serving as component (D) is activated by irradiation with a high energy beam such as ultraviolet rays or the like, has a characteristic where a curing reaction proceeds at room temperature (25° C. to 80° C.) with a pot life (open time) that is practically sufficient for performing assembly/adhering work between members. Therefore, by performing light irradiation in advance of assembly/adhering work even for sites that are difficult to irradiate with ultraviolet rays and other light after assembly/adhering work, the timing of the start of a curing (adhesion) reaction can be controlled to some extent, and adhesives with excellent curability/adhesive strength can be applied even to sites that are originally difficult to irradiate with ultraviolet rays. Thus, unlike ordinary photo-curable compositions, an advantage is provided of not causing problems of curing failure or adhesion failure to a shielded site.

[One-Component Composition]

The curable organopolysiloxane composition of the present invention is a one-component composition in which all components are mixed in advance, which can be stably stored and as a one-component composition at low temperature even without utilizing a multi-component formulation such as separating a catalyst or the like serving as a curing agent, and in which a curing reaction can proceed even at a low temperature by irradiation with a high energy beam such as ultraviolet rays or the like to achieve excellent adhesion to a base material. This has an advantage of eliminating the need for pre-mixing and other processes required for a multi-component composition, thereby simplifying use and not causing problems such as loss of material and the like. Furthermore, the curable organopolysiloxane composition of the present invention can be stored stably even when pre-mixed packages are formed on a small scale, which has an advantage of providing a stable and economical product for micro-volume applications that require dispensing and use on a small scale.

[Cured Product]

The present invention also relates to a cured product of the curable organopolysiloxane composition of the present invention. The curable organopolysiloxane of the present invention can be cured to provide a silicone rubber composition with a JIS A hardness of 5 or more, and preferably 10 to 90. In other words, the cured product of the curable organopolysiloxane composition of the present invention has a JIS A hardness of 5 or more, and preferably 10 to 90. If the hardness of the cured product of the curable organopolysiloxane composition is within the range above, a cured product with excellent adhesive properties can be obtained.

[Protective Agent or Adhesive and Electronic Device]

The curable organopolysiloxane composition according to the present invention can provide an electrical/electronic device provided with the cured product thereof. In particular, due to the abovementioned configuration, characteristically, the present composition, even in small amounts and a thin layer, is firmly initially adhered to an adherend, in addition to being able to achieve high adhesive strength. Furthermore, despite being a one-component type, there is also a characteristic of curing at low temperatures and achieving strong adhesion by irradiating with a high energy beam such as ultraviolet rays and the like. Therefore, an adhesive layer including the curable organopolysiloxane composition according to the present invention has a firm bond to various types of adherends and forms an adhesive/pressure sensitive adhesive state (cohesive mode of failure upon forcibly peeling off) which is difficult to peel off by interfacial peeling, and the like. Specifically, the curable organopolysiloxane composition of the present invention is suitably used in an electrical/electronic device provided with an adhesive layer or protective layer. Furthermore, the curable organopolysiloxane composition according to the present invention exerts high initial adhesion and adhesive strength to an adherend in an adhesive form other than thin layer adhesion. Therefore, the composition is also useful as a conventionally used thick coating, potting agent, encapsulating agent, or sealant, and can provide an electrical/electronic device provided with an adhesive layer or protective layer.

The electrical/electronic component according to the present invention is not particularly limited so long as encapsulating or sealing by the composition is possible, and examples thereof include electronic devices including an electric circuit, electrode, or the like, where a metal electrode such as silver, copper, aluminum, gold, or the like or a metal oxide film electrode such as ITO (Indium Tin Oxide) or the like is formed on a base material of glass, an epoxy resin, polyimide resin, phenol resin, ceramic, or the like. The protective agent or adhesive including the curable organopolysiloxane composition according to the present invention is a one-component type, has excellent handling properties due to low temperature curability, has excellent initial adhesion improving effects, and can achieve high adhesive strength with particularly excellent adhesive durability after curing. Therefore, when used as an adhesive, potting material, coating material, sealing material, or the like for adhering, encapsulating, or sealing electrical/electronic components, the reliability and durability of the electrical/electronic components can be improved. In particular, the composition can be suitably used as a protective agent or adhesive for plastic components, as an adhesive for optical components, or as an adhesive or protective agent for components such as motors, coils, microphones, and speakers or the like.

The protective agent or adhesive agent for an electrical/electronic component according to the present invention is useful as a sealing material of a structural body including metal and/or resin requiring durability, water resistance, and the like, such as peripheral components, onboard component cases, terminal boxes, illumination components, solar cell modules, and the like of electrical/electronic devices, and has excellent initial adhesion and adhesive durability, for example, when applied to a circuit board and housing case thereof in the application of power semiconductors such as engine controls (in transport equipment), power/train systems, air conditioner controls, and the like. Furthermore, advantageously, when the composition is also incorporated into onboard electronic components such as an electronic control unit (ECU) and the like and used under harsh environments, excellent adhesive durability is achieved, while the reliability and durability of the power semiconductors, onboard components, and the like, as well as water resistance to rainwater, or the like, can be improved. The method of use thereof is not particularly limited thereto, and use is possible, for example, in a form such as in an elastic sealing material in a waterproof structure of an onboard engine control circuit described in JP 2007-235013 A. Similarly, use is possible as a sealing material for the purpose of waterproofing in an automobile harness with a terminal described in JP 2009-135105 A, or use in a waterproofing agent containing a silicone resin in a waterproofing method of an electric wire and a waterproofing structure of an electric wire described in JP 2012-204016 A. Furthermore, as described in JP 2002-170978 A and the like, use is possible as a sealing resin in a method of connecting a solar cell module, terminal box, and solar cell module.

The protective agent or adhesive for an electrical/electronic component of the present invention can be used as a thermally conductive or electrically conductive material. Specifically, the agent is useful as a heat transferring material (thermally conductive member) to be interposed at an interface between a thermal boundary surface of a heat-generating component and a heat-dissipating member such as a heat sink, a circuit board, or the like for cooling the heat-generating component by thermal conduction, and a heat-dissipating structural body can be formed provided with the composition. Herein, the type, size, and detailed structure of the heat-generating component are not particularly limited. Furthermore, depending on the amount of the thermally conductive filler filled, the thermal conductivity may be 2.0 W/mK or higher, preferably 3.5 W/mK or higher, and more preferably 4.0 W/mK or higher. Electrical/electronic devices provided with such a thermally conductive member are not particularly limited, and examples include: cell-based lithium-ion electrode secondary batteries, cell-stack fuel cells, and other secondary batteries; printed circuit boards and other electronic circuit boards; diodes (LEDs), organic electric field element (organic EL), laser diodes, LED arrays, and other IC chips packaged with optical semiconductor elements; personal computers, digital video discs, mobile phones, smartphones, and other CPUs used in electronic devices; and driver ICs, memory, and other LSI chips; and the like. Furthermore, when used as an electrically conductive material, use is possible for grounding, static eliminating, and as an EMI shielding material for an electrical/electronic component.

EXAMPLES

The present invention will be described below using examples, but the present invention is not limited thereto. Moreover, the adhesiveness of the curable organopolysiloxane composition was evaluated by the following method.
<Method of Preparing Curable Organopolysiloxane Composition>
Curable organopolysiloxane compositions shown in Table 1 below were prepared. Specifically, components (A-1), (A-2), (B), (E-1), and (E-2) were mixed in advance to form a liquid mixture, which was thoroughly stirred and then subjected to a defoaming process. Furthermore, components (C-1) or (C-2), (D-1) or (D-2), (F-1), (F-2), and (F-3) were mixed and then added and mixed in the aforementioned liquid mixture using a cartridge mixer. A resulting liquid was placed in a plastic tube sealed by aluminum.
[Evaluation of Viscosity]
The viscosity of the obtained curable organopolysiloxane composition was measured on a rheometer (MCR-102, manufactured by Anton Paar) by a shear sweep method at a shear rate of 0.05 to 100/s. The viscosity at a shear rate of 10/s was recorded. Thereafter, a change in viscosity was calculated by the equation: (viscosity after 3 days at 25° C., 50% humidity)/(initial viscosity)×100. When no viscosity change occurs (favorable evaluation), the value is less than 150%, and therefore, a change of less than 150% is evaluated as "OK" and a change exceeding 150% is evaluated as "NG" (Not Good), which were then entered in the table.
[Evaluation of Adhesion (Mode of Failure) in Adhesion Test]
Two polycarbonate (PC) resin boards were prepared as adherends. A surface of the adherend was washed with isopropanol in advance, coated with the prepared curable organopolysiloxane composition, and then irradiated with UV light (365 nm, 4 J/cm$^2$) to activate the platinum catalyst. Within 5 minutes thereafter, a Teflon (registered trademark) spacer was used for pressing against a 10×10×1 mm aluminum die to achieve a thickness of 360 μm and allowed to stand for 2 hours at a temperature of 80±2° C. or 150±2° C. The curable organopolysiloxane composition was then cured, which was then used to measure a mode of failure in the adhesion test.

The failure state of the adhesive after fracture of the adhesion test piece was confirmed. The failure state of the adhesive is divided into two types (mode of failure of an adhesive layer): a cohesive failure and interfacial peeling. In the case of an ideal adhesive state, the failure mode is a cohesive failure. Herein, "OK" and "NG" in Table 1 below represent, respectively, the failure modes "cohesive failure (CF)" and "interfacial peeling (AF)".

Si—H/Si—Vi in Table 1 represents the ratio of the number of mols of vinyl groups to the number of mols of silicon atom-bonded hydrogen atoms in the composition.

In Table 1, the components used are as follows. Note that the viscosity is a value measured by a rotary viscometer at 25° C.
(A-1)
Dimethylpolysiloxanes capped at both molecular chain terminals with dimethylvinylsiloxy groups (viscosity: 10,000 mPa·s, amount of Vi: 0.13 mass %)
(A-2)
Mixture of 74 mass % dimethylpolysiloxanes capped at both molecular chain terminals with dimethylvinylsiloxy groups (viscosity: 2,000 mPa·s, amount of Vi: 0.23 mass %) and 26 mass % fumed silica surface treated with hexamethyldisilazane
(B)
Methylhydrogensiloxane capped at both molecular chain terminals with trimethylsiloxy groups (amount of SiH: 1.6 mass %)
(C-1)
(Methylcyclopentadienyl) trimethyl platinum (IV)
(C-2)
1,3-divinyl-1,1,3,3-tetramethyldisiloxane complex of platinum (mass units of platinum metal: 1.6 mass %)
(D-1)
Tetra-tert-butoxy titanium
(D-2)
Acetoalkoxyaluminum diisopropylate (=C18 alkyl group-containing aluminum alkylacetoacetate diisopropoxide) expressed by the following formula

[Formula 15]

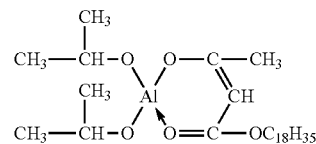

(E-1)
Tetramethyltetravinylcyclotetrasiloxane
(E-2)
1-ethynyl-2-cyclohexanol
(F-1)
Hexamethoxysilylhexane
(F-2)
3-glycidoxypropyltrimethoxysilane
(F-3)
SiH and trialkoxysilyl group-containing siloxane expressed by the following formula (viscosity: 1.6 mPa·s, amount of SiH: 0.35 mass %)

[Formula 16]

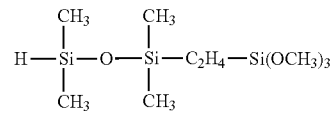

TABLE 1

| Component/blending amount (mass parts) | Examples | | | Comparative Examples | | | |
|---|---|---|---|---|---|---|---|
| | 1 | 2 | 3 | 1 | 2 | 3 | 4 |
| A-1 | 54.65 | 54.65 | 54.65 | 54.65 | 54.65 | 54.65 | 54.65 |
| A-2 | 40 | 40 | 40 | 40 | 40 | 40 | 40 |

TABLE 1-continued

| Component/blending amount (mass parts) | Examples | | | Comparative Examples | | | |
|---|---|---|---|---|---|---|---|
| | 1 | 2 | 3 | 1 | 2 | 3 | 4 |
| B | 2.1 | 2.1 | 2.1 | 2.1 | 2.1 | 2.1 | 2.1 |
| C-1 | 0.16 | 0.16 | 0.16 | 0.16 | 0 | 0 | 0 |
| C-2 | 0 | 0 | 0 | 0 | 0.34 | 0.17 | 0.17 |
| D-1 | 0.1 | 0 | 0.1 | 0 | 0.1 | 0.1 | 0.1 |
| D-2 | 0 | 0.1 | 0 | 0 | 0 | 0 | 0 |
| E-1 | 0.4 | 0.4 | 0.4 | 0.4 | 0.4 | 0.4 | 0.4 |
| E-2 | 0 | 0 | 0 | 0 | 0 | 0.16 | 0.16 |
| F-1 | 0.8 | 0.8 | 0.8 | 0.8 | 0.8 | 0.8 | 0.8 |
| F-2 | 0.8 | 0.8 | 0.8 | 0.8 | 0.8 | 0.8 | 0.8 |
| F-3 | 0 | 0 | 0.5 | 0 | 0 | 0 | 0 |
| Si—H/Si—Vi | 1.5 | 1.5 | 1.5 | 1.5 | 1.5 | 1.5 | 1.5 |
| Amount of platinum (ppm) | 20 | 20 | 20 | 20 | 20 | 10 | 10 |
| Curing conditions for adhesion tests | | | | 80° C., 2 hrs | | | 150° C., 1 hr |
| Viscosity change after 3 days at 25° C., 50% humidity | OK | OK | OK | OK | Curing during mixing (NG) | OK | OK |
| Adhesion to PC — Initial | OK | OK | OK | NG | Curing during mixing (NG) | Did not cure | PC deformed |
| Adhesion to PC — 25° C., 50% RH, after 3 days | OK | OK | OK | NG | Curing during mixing (NG) | Did not cure | PC deformed |

Comparative Example 1, which does not contain a condensation catalyst, has inferior adhesion to PC, and interfacial separation occurred from an initial stage when the failure mode was evaluated. Furthermore, in Comparative Examples 2 and 3, where a non-light-activated catalyst was used as the hydrosilylation reaction catalyst, adhesion or curing properties were not as well controlled as compared to when the photo-active hydrosilylation reaction catalyst of the present invention was used, and the catalyst either cured during mixing (Comparative Example 2) or did not cure (Comparative Example 3). Furthermore, in Comparative Example 4, where the curing temperature was increased for curing as compared to Comparative Example 3, the PC was deformed. Therefore, Comparative Examples 3 and 4 were not practical because favorable curability at low temperatures could not be achieved, and the base material was damaged at high temperatures.

On the other hand, the curable organopolysiloxane compositions of the present invention indicated in Examples 1 to 3 all exhibited a failure mode to PC of cohesive failure (CF), and a small change in viscosity after 3 days at 25° C. and 50% humidity of less than 150%. In other words, the compositions related to the present invention, in which the photo-active hydrosilylation reaction catalyst (C) and condensation reaction catalyst (D) were used in combination, achieved strong adhesive strength with the adherend and had stable curing properties with little change in viscosity over time.

INDUSTRIAL APPLICABILITY

The curable organopolysiloxane composition of the present invention can be stored as one component and thus has excellent handling properties. Furthermore, by irradiating with a high energy beam such as ultraviolet rays or the like, curing is possible even at a relatively low temperature and excellent adhesion to a base material over time can be exhibited, thus making it possible to achieve favorable adhesive strength even for base materials to which adhesion is difficult, such as resins and the like. Furthermore, excellent adhesion is exhibited even if cured at a low temperature. Therefore, the composition is useful as a protective agent or adhesive for plastic components that are susceptible to heat deformation, an adhesive for optical components, or a protective agent or adhesive for components such as a motor, coil, microphone, speaker, or the like. Furthermore, the curable organopolysiloxane compositions of the present invention can be cured at a relatively low temperature and provide excellent adhesion by irradiating with a high energy beam such as ultraviolet rays or the like, even with a large amount of an inorganic filler added, and therefore are useful as functional fillers with thermal conductivity or electrical conductivity. Furthermore, the curable organopolysiloxane composition of the present invention can ensure sufficient pot life (open time) for practical use in assembly/adhering work between components after UV irradiation. Therefore, light irradiation can be performed in advance to perform a curing reaction/adhesion even on sites where application of an ordinary photo-curable composition is difficult and light irradiation of ultraviolet rays or the like is difficult to perform after assembly/adhering work. Thus, it is possible to improve the process and work efficiency of assembly/adhering work of optical components, and the like described above.

The invention claimed is:

1. A one-component curable organopolysiloxane composition, comprising:
    (A) an organopolysiloxane having at least two alkenyl groups in each molecule thereof;
    (B) an organopolysiloxane having at least two silicon atom-bonded hydrogen atoms in a molecule;
    (C) a photo-active hydrosilylation reaction catalyst;
    (D) a condensation reaction catalyst;
    (E) a curing inhibitor; and (F) an adhesion imparting agent comprising a trialkoxysilyl-containing siloxane expressed by the following formula:

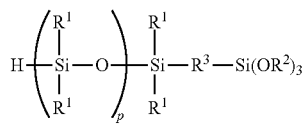

where $R^1$ represents the same or a different monovalent hydrocarbon group not having an aliphatic unsaturated bond, $R^2$ represents an alkyl group, $R^3$ represents an alkylene group, and p is an integer of from 1 to 50.

2. The curable organopolysiloxane composition according to claim 1, wherein component (B) is present in an amount such that the molar ratio of silicon atom-bonded hydrogen atoms relative to alkenyl groups in all components of the curable organopolysiloxane composition is within a range of 0.3 to 10.

3. The curable organopolysiloxane composition according to claim 1, wherein the amount of component (D) is 0.5 mass % or less relative to the total mass of the curable organopolysiloxane composition.

4. The curable organopolysiloxane composition according to claim 1, wherein:
  i) component (A) is a dialkylpolysiloxane capped at both molecular chain terminals with dialkylalkenylsiloxy groups;
  ii) component (B) is an alkylhydrogenpolysiloxane capped at both molecular chain terminals with trialkylsiloxy groups; or
  iii) both i) and ii).

5. The curable organopolysiloxane composition according to claim 1, wherein for the formula of component (F), each $R^1$ and $R^2$ is individually a methyl group or an ethyl group, $R^3$ is an ethylene group or a propylene group, and p is an integer of from 1 to 5.

6. The curable organopolysiloxane composition according to claim 1, wherein the amount of component (F) is 0.05 to 10 mass % relative to the total mass of the curable organopolysiloxane composition.

7. The curable organopolysiloxane composition according to claim 1, further comprising (G) an adhesion promoter.

8. The curable organopolysiloxane composition according to claim 1, further comprising (H) an inorganic filler.

9. The curable organopolysiloxane composition according to claim 1, curable at a temperature of 80° C. or lower.

10. The curable organopolysiloxane composition according to claim 1, which provides a silicone rubber composition having a JIS A hardness of 5 or higher by curing.

11. A protective agent or adhesive for an electrical/electronic component, comprising the curable organopolysiloxane composition according to claim 1.

12. An electrically conductive or thermally conductive curable composition, comprising the curable organopolysiloxane composition according to claim 1.

13. A cured product of the curable organopolysiloxane composition according to claim 1.

14. An electrical/electronic device, comprising the cured product according to claim 13.

15. An electrical/electronic device, wherein an electrical/electronic component is adhered, encapsulated, sealed, or filled with the curable organopolysiloxane composition according to claim 1.

16. A one-component curable organopolysiloxane composition, comprising:
  (A) an organopolysiloxane having at least two alkenyl groups in each molecule thereof;
  (B) an organopolysiloxane having at least two silicon atom-bonded hydrogen atoms in a molecule;
  (C) a photo-active hydrosilylation reaction catalyst;
  (D) a condensation reaction catalyst;
  (E) a curing inhibitor; and
  (F) an adhesion imparting agent having at least one terminal trialkoxysilyl group; and
    wherein the curable organopolysiloxane composition provides a silicone rubber composition having a JIS A hardness of 5 or higher by curing.

17. The curable organopolysiloxane composition according to claim 16, wherein:
  i) component (A) is a dialkylpolysiloxane capped at both molecular chain terminals with dialkylalkenylsiloxy groups;
  ii) component (B) is an alkylhydrogenpolysiloxane capped at both molecular chain terminals with trialkylsiloxy groups; or
  iii) both i) and ii).

18. The curable organopolysiloxane composition according to claim 16, wherein component (F) is a trialkoxysilyl-containing siloxane expressed by the following formula:

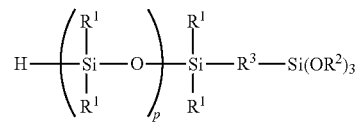

where each $R^1$ and $R^2$ is individually a methyl group or an ethyl group, $R^3$ is an ethylene group or a propylene group, and p is an integer of from 1 to 5.

19. An electrically conductive or thermally conductive curable composition, comprising a one-component curable organopolysiloxane composition, the curable organopolysiloxane comprising:
  (A) an organopolysiloxane having at least two alkenyl groups in each molecule thereof;
  (B) an organopolysiloxane having at least two silicon atom-bonded hydrogen atoms in a molecule;
  (C) a photo-active hydrosilylation reaction catalyst;
  (D) a condensation reaction catalyst;
  (E) a curing inhibitor; and
  (F) an adhesion imparting agent having at least one terminal trialkoxysilyl group.

20. The curable organopolysiloxane composition according to claim 19, wherein:
  i) component (A) is a dialkylpolysiloxane capped at both molecular chain terminals with dialkylalkenylsiloxy groups;
  ii) component (B) is an alkylhydrogenpolysiloxane capped at both molecular chain terminals with trialkylsiloxy groups; or
  iii) both i) and ii).

21. The curable organopolysiloxane composition according to claim 19, wherein component (F) is a trialkoxysilyl-containing siloxane expressed by the following formula:

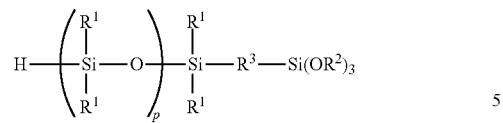
where each $R^1$ and $R^2$ is individually a methyl group or an ethyl group, $R^3$ is an ethylene group or a propylene group, and p is an integer of from 1 to 5.
* * * * *